(12) United States Patent
Eichstaedt et al.

(10) Patent No.: US 8,768,761 B2
(45) Date of Patent: Jul. 1, 2014

(54) UNLOCKING COUPON OFFERS

(75) Inventors: Matthias Eichstaedt, San Jose, CA (US); Deepak Goel, Delhi (IN); Sunil Keshav Bopardikar, Sunnyvale, CA (US)

(73) Assignee: Coupons.com Incorporated, Mountain View, CA (US)

( * ) Notice: Subject to any disclaimer, the term of this patent is extended or adjusted under 35 U.S.C. 154(b) by 0 days.

(21) Appl. No.: 13/425,062

(22) Filed: Mar. 20, 2012

(65) Prior Publication Data

US 2013/0030895 A1   Jan. 31, 2013

Related U.S. Application Data

(60) Provisional application No. 61/513,330, filed on Jul. 29, 2011, provisional application No. 61/513,341, filed on Jul. 29, 2011.

(51) Int. Cl.
    *G06Q 30/00*   (2012.01)
    *G06Q 30/02*   (2012.01)

(52) U.S. Cl.
    CPC ........ *G06Q 30/0211* (2013.01); *G06Q 30/0214* (2013.01); *G06Q 30/0207* (2013.01)
    USPC ..................... 705/14.13; 705/14.16; 705/14.1

(58) Field of Classification Search
    USPC ...................................................... 705/14.13
    See application file for complete search history.

(56) References Cited

U.S. PATENT DOCUMENTS

| | | | |
|---|---|---|---|
| 4,745,468 A | 5/1988 | Von Kohrn |
| 4,876,592 A | 10/1989 | Von Kohrn |
| 4,926,255 A | 5/1990 | Von Kohrn |
| 5,034,807 A | 7/1991 | Von Kohrn |
| 5,057,915 A | 10/1991 | Von Kohrn |
| 5,128,752 A | 7/1992 | Von Kohrn |

(Continued)

FOREIGN PATENT DOCUMENTS

| AU | 2006/294868 | 6/2011 |
|---|---|---|
| KR | 20020074032 A | 9/2002 |

OTHER PUBLICATIONS

Van Grove. Twitter to Facebook: 5 Ways to Post to Both, Mashable, May 25, 2009, found online at masahble.com/2009/05/25/twitter-to-facebook/ (11 pages).

(Continued)

*Primary Examiner* — John G Weiss
*Assistant Examiner* — Scott C Anderson
(74) *Attorney, Agent, or Firm* — Hickman Palermo Truong Becker Bingham Wong LLP; Daniel D. Ledesma

(57) ABSTRACT

In an embodiment, a method comprises receiving an indication that a user selected social network data that is displayed, on a client device, concurrently with offer data that indicates a coupon offer; wherein prior to receiving the indication, the user of the client device is incapable of accessing the coupon offer; in response to receiving the indication that the user selected the social network data, allowing the user to access the coupon offer, and causing a message to be sent to each user of a plurality of users that are identified, in a social network, as connected to the user, wherein the message includes data about the coupon offer or a coupon provider that initiated the coupon offer; wherein the method is performed by one or more computing devices.

24 Claims, 3 Drawing Sheets

(56) References Cited

U.S. PATENT DOCUMENTS

| | | | |
|---|---|---|---|
| 5,227,874 A | 7/1993 | Von Kohrn | |
| 5,249,044 A | 9/1993 | Von Kohrn | |
| 5,250,789 A | 10/1993 | Johnsen | |
| 5,283,734 A | 2/1994 | Von Kohrn | |
| 5,368,129 A | 11/1994 | Von Kohrn | |
| 5,508,731 A | 4/1996 | Kohrn | |
| 5,697,844 A | 12/1997 | Von Kohrn | |
| 5,713,795 A | 2/1998 | Von Kohrn | |
| 5,759,101 A | 6/1998 | Von Kohrn | |
| 5,761,648 A | 6/1998 | Golden et al. | |
| 5,791,991 A | 8/1998 | Small | |
| 5,907,830 A | 5/1999 | Engel et al. | |
| 5,916,024 A | 6/1999 | Von Kohrn | |
| 6,321,208 B1 | 11/2001 | Barnett | |
| 6,336,099 B1 | 1/2002 | Barnett et al. | |
| 7,640,240 B2 | 12/2009 | Boal et al. | |
| 7,734,621 B2 | 6/2010 | Weitzman et al. | |
| 7,784,702 B2 | 8/2010 | Michels | |
| 7,962,931 B2 | 6/2011 | Bova | |
| 8,000,496 B2 | 8/2011 | Keswanie et al. | |
| 8,055,642 B2 | 11/2011 | Boal et al. | |
| 8,165,078 B2 | 4/2012 | Walsh et al. | |
| 2002/0042739 A1* | 4/2002 | Srinivasan et al. | 705/14 |
| 2002/0065713 A1 | 5/2002 | Awada et al. | |
| 2002/0198843 A1* | 12/2002 | Wang et al. | 705/51 |
| 2004/0236607 A1 | 11/2004 | Kost et al. | |
| 2005/0216300 A1 | 9/2005 | Appelman et al. | |
| 2006/0212355 A1 | 9/2006 | Teague et al. | |
| 2008/0133336 A1 | 6/2008 | Altman et al. | |
| 2008/0275767 A1 | 11/2008 | Rafie | |
| 2009/0024477 A1 | 1/2009 | Kramer et al. | |
| 2009/0076912 A1* | 3/2009 | Rajan et al. | 705/14 |
| 2010/0094940 A1 | 4/2010 | Tsai et al. | |
| 2010/0185504 A1 | 7/2010 | Rajan et al. | |
| 2010/0228617 A1 | 9/2010 | Ransom et al. | |
| 2011/0023101 A1 | 1/2011 | Vernal et al. | |
| 2011/0106600 A1 | 5/2011 | Malik et al. | |
| 2012/0071235 A1 | 3/2012 | Walker et al. | |
| 2013/0030895 A1 | 1/2013 | Eichstaedt et al. | |
| 2013/0030901 A1 | 1/2013 | Eichstaedt et al. | |

OTHER PUBLICATIONS

Korean Intellectual Property Office, Search Report and Written Opinion, application No. PCT/US2012/048048, dated Feb. 13, 2013, 9 pages.
Current Claims in application No. PCT/US2012/048048, dated Feb. 2013, 5 pages.
Korean Intellectual Property Office, Search Report and Written Opinion, application No. PCT/US2012/048107, dated Feb. 15, 2013, 10 pages.
Current Claims in application No. PCT/US2012/048107, dated Feb. 2013, 3 pages.
Korean Intellectual Property Office, Search Report and Written Opinion, application No. PCT/US2012/048126, dated Feb. 15, 2013, 10 pages.
Current Claims in application No. PCT/US2012/048126, dated Feb. 2013, 4 pages.

* cited by examiner

UNLOCKING COUPON OFFERS

BENEFIT CLAIM; CROSS-REFERENCE TO RELATED APPLICATIONS

This application claims the benefit of U.S. Provisional Application Nos. 61/513,330 and 61/513,341, both filed Jul. 29, 2011, the entire contents of which are hereby incorporated by reference as if fully set forth herein, under 35 U.S.C. §119(e).

This application is related to U.S. application Ser. No. 13/287,696, entitled, "Coupons Social Networking Platform," and filed Nov. 2, 2011, the entire contents of which is hereby incorporated by reference as if fully set forth herein.

TECHNICAL FIELD

Embodiments relate generally to offering an electronic offer to a potential redeemer.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general, a coupon is a certificate or other document that entitles its holder to accept an offer described or referenced by the coupon. The offer, also subsequently referred to as the "coupon offer," may be any type of offer, but typically is an offer by the coupon provider to provide a customer with one or more goods or services at a particular price or discount. For example, a coupon may indicate $1 off or 25% off of a purchase price of an item or may indicate the particular price, such as $10. Alternatively, the coupon offer may be an offer to provide the customer with a gift in exchange for the performance of an act, such as purchasing a good or service.

A coupon often takes a "hard copy" form, such as a paper certificate, with printed images and/or text describing terms of the offer. "Redeeming" a coupon is the process of a customer accepting a coupon offer by presenting, referencing, or otherwise providing the coupon while purchasing, contracting, or otherwise transacting with another party. For example, a customer may redeem a hard copy of a coupon by handing the copy to a clerk during a purchase at a retail store. The clerk may then provide the customer with the offered discounted price or gift.

One technique for distributing coupons is to include printed coupons with newspapers, magazines, or other items that are distributed to customers. One example of an item with which coupons are distributed is a printed receipt. For example, some retailers print receipts at a point of sale on register paper on which coupons have been pre-printed. As another example, some retailers print coupon(s) on a receipt at the time of the transaction for which the receipt is printed, thereby allowing the retailers to dynamically select which coupon(s) appear on the receipt based on the product(s) that were purchased during the transaction.

Recent distribution techniques now provide customers with opportunities to print their own coupons. For example, a manufacturer of a product publishes a coupon for the product on the manufacturer's website. However, this type of distribution requires potential customers to first locate the manufacturer's website. In this example, the manufacturer is not reaching each potential customer.

SUMMARY OF THE INVENTION

The appended claims serve to summarize the invention.

DETAILED DESCRIPTION

Figure 1:
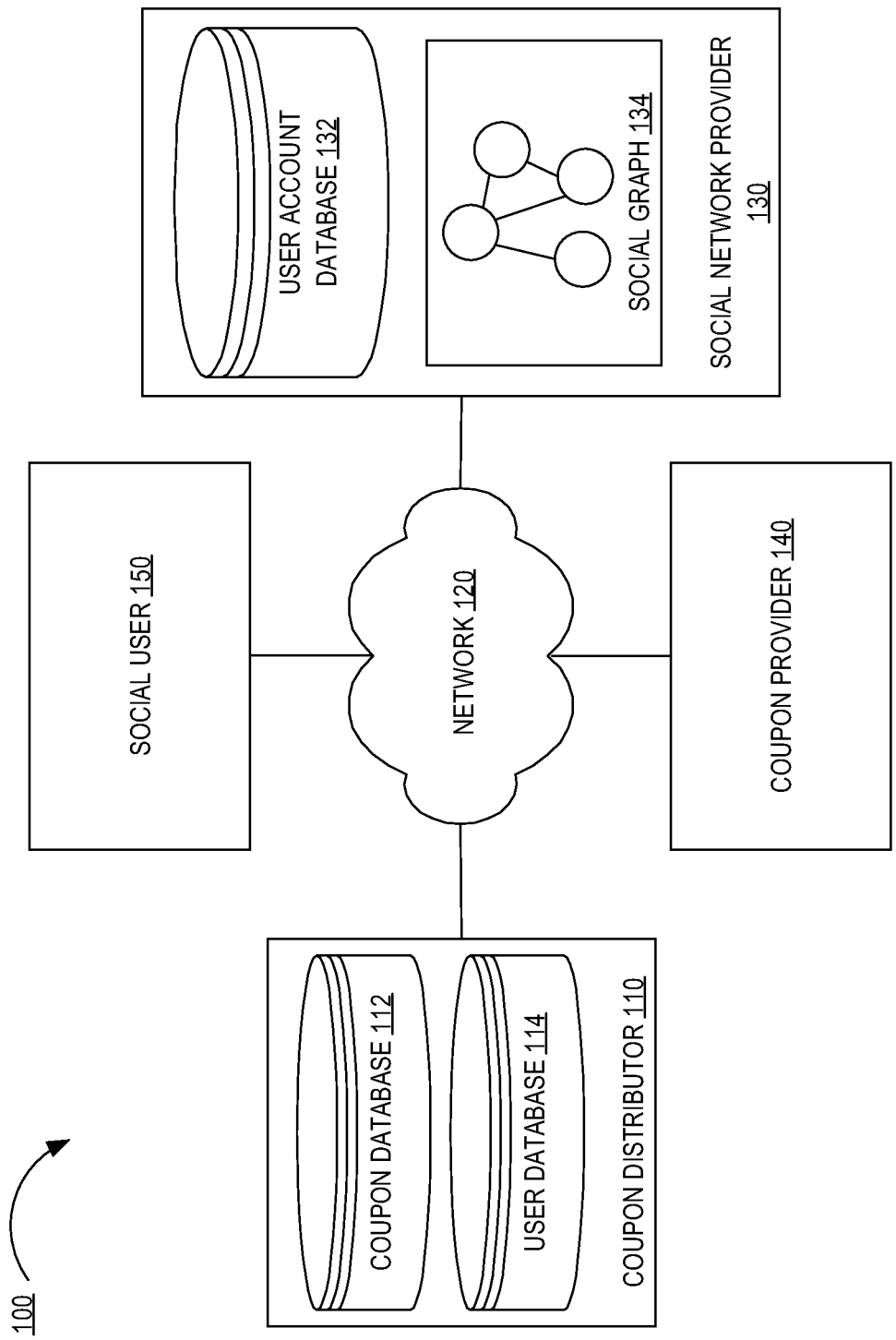
FIG. 1 illustrates an example computer system architecture for unlocking a digital offer.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Architectural Overview
3.0. Unlocking An Digital Offer
   3.1 "Liking" An Item
   3.2 Determine Whether to Unlock Offer
      3.2.1 "Like" Check
      3.2.2 Inventory Check
      3.2.3 Access Check
      3.2.4 Changes to a Check
   3.3 Unlocking
   3.4 Social Notification Message
      3.4.1 Message Templates
4.0. Implementation Mechanism—Hardware Overview
5.0. Extensions and Alternatives 1.0. General Overview Social networking services, such as Facebook and Google+, provide environments for sharing information with friends. Messages initiated by one registered user and sent to friends or contacts of the user may include a status update, a current location, a picture, a reminder, or general tips and opinions. Information in which many registered users of a social network provider are interested can travel through the corresponding social network very rapidly and reach a substantial audience.

In an embodiment, a computer system makes a commercial offer (for example, a coupon, special deal, or exclusive promotion) available as a node in a social graph that is maintained by a social network service provider (or simply, "social network provider"). Initially, the offer node is locked and unusable by a social network user who attempts to view contents of the offer. The registered user of the social network provider can exercise the offer only when the user initiates the linking of his/her own profile node with the offer node. Establishing a link between the node of a social user and a coupons/offer/deal node causes the offer to automatically unlock for the individual, making the offer available and usable.

In an embodiment, in response to an offer unlocking and becoming accessible to the social user that unlocked the offer), a message is propagated into the user's activity stream, such that the user's friends in the social network are notified of the offer or of the brand of the product/service that is subject of the coupon. In this way, unlocking an offer by one social user promotes the viral distribution of the offer.

For example, in the context of the Facebook environment a coupon can be represented as an Open-Graph node with basic metadata about the offer (price, description, brand, and store). If a user desires to print (or otherwise access) the coupon, then the user must first "like" the coupon, thereby unlocking the printing capability. By "liking" the coupon, a message (for example, "Mark just saved $1 on Chocolate Cookies") is automatically broadcasted to his circle of friends.

Although the following describes how a coupon offer is unlocked for a user, embodiments of the invention are not so limited. Other digital content that may be locked and subsequently unlocked includes videos, images, e-books, invitations, tickets to events, etc.

2.0. Architectural Overview

FIG. 1 illustrates an example computer system architecture 100 for unlocking coupon offers. In an embodiment, system architecture 100 includes coupon distributor 110, network 120, social network provider 130, coupon provider 140, and social user 150. One or more computers may implement each of the elements of FIG. 1. In an alternative embodiment, computer system architecture 100 does not include coupon distributor 110. Thus, coupon provider 140 does not rely on another entity (like coupon distributor 110) to distribute coupons that coupon provider 140 provides.

In an embodiment where coupon distributor 110 involved, coupon distributor 110 includes one or more computing devices and one or more storage devices that store data regarding coupons of one or more coupon providers and users of one or more social network providers. In the depicted example, coupon distributor 110 includes a coupon database 112 and a user database 114, each of which is described in more detail below. Each of databases 112 and 114 may be part of the same storage device or may be part of separate storage devices.

In an embodiment, the logic, configuration or programs hosted in coupon distributor 110 allows coupons to be distributed to users of social network provider 130, causes new coupon nodes to be introduced into a social graph of social network provider 130, allows a user of social network provider 130 to link his/her node to a coupon node in the social graph, and gathers and stores information about users of social network provider 130 (and, optionally, of other social network providers, not shown).

The functionality of coupon distributor 110 and coupon provider 140 may be implemented using stored program logic in one or more special-purpose computers or loaded from one or more non-transitory media into the memory of one or more general-purpose computer and then executed.

Communication between various entities depicted in FIG. 1 may be made over a network 120. Network 120 may be implemented by any medium or mechanism that provides for the exchange of data between various entities communicatively coupled to network 120. Examples of network 120 include, without limitation, a network such as a Local Area Network (LAN), Wide Area Network (WAN), Ethernet or the Internet, or one or more terrestrial, satellite, or wireless links. Network 120 may include a combination of networks such as those described. Network 120 may transmit data according to Transmission Control Protocol (TCP), User Datagram Protocol (UDP), and/or Internet Protocol (IP).

Social network provider 130 provides a social networking service. Examples of social network providers include Facebook, Google+, Twitter, and Hi5. Social network provider 130 includes one or more computing devices and one or more storage devices that store data (for example, in user account database 132) regarding one or more users that are registered with the service, and connections between users and between users and content. Users may be individuals or organizations, such as business entities. The connections between users and between users and content items may be viewed as a social graph, such as social graph 134. Although only a single social network provider 130 is depicted in FIG. 1, system architecture 100 may include multiple social network providers with which coupon distributor 110 interacts in order to distribute coupons and, in one embodiment, target messages to users that are registered with the various social network providers.

Coupon provider 140 is a business entity that manufactures a product or represents a brand and issues coupons (or authorizes a third-party, such as coupon distributor 110, to issue coupons on its behalf) to encourage the purchase of a product that is subject of a coupon campaign that coupon provider 140 initiates. In an embodiment, coupon provider 140 communicates coupon data to coupon distributor 110 over network 120. The coupon data includes information about one or more coupons of one or more coupon campaigns managed by coupon distributor 110. Coupon distributor 110 is responsible for acting on behalf of coupon provider 140 to distribute coupons reflected in the coupon data to potential customers.

Although only a single coupon provider 140 is depicted in FIG. 1, computer system architecture 100 may include numerous coupon providers, each of which is registered with social network provider 130 and contracts with coupon distributor 110 to run their respective coupon campaigns. Thus, coupon database 112 may include coupon data for multiple coupon campaigns from multiple coupon providers.

Social user 150 is any potential customer that is registered with social network provider 130. Social user 150 may use one or multiple computing devices to access a social network service provided by social network provider 130. Examples of computing devices that a social user may use to access the social network service and obtain a coupon include a desktop computer, a laptop computer, a tablet computer, and a smartphone.

Although only a single social user 150 is depicted in FIG. 1, system architecture 100 may include numerous social users, each of which is registered with social network provider 130. Thus, user database 114 may include user data for multiple users of social network provider 130 and multiple users of other social network providers (not depicted).

3.0. Unlocking a Digital Offer

Figure 2:
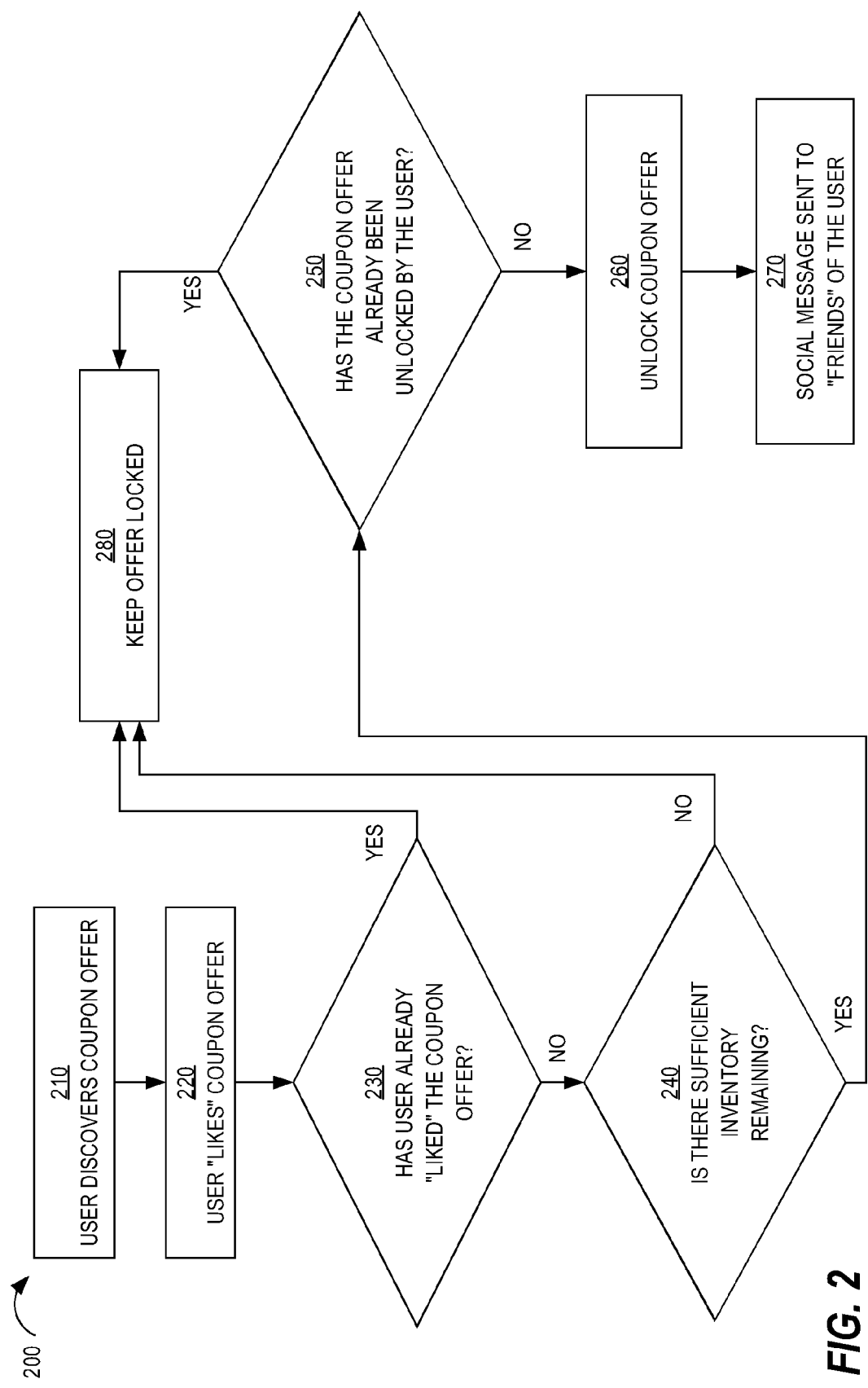
FIG. 2 illustrates an example computer-implemented process for unlocking a coupon offer.

FIG. 2 illustrates an example process 200 for unlocking a coupon offer. At block 210, social user 150 discovers a coupon offer. Using a device, social user 150 may discover the coupon offer through one of numerous possible locations. For example, social user 150 may discover the coupon offer on a web page provided by coupon distributor 110 (such as Coupons.com), on a web page provided by coupon provider 140 (such as Gamma Mills), on a "fan" page (for coupon provider 140) that is hosted by social network provider 130, on a search results page provided by a search engine, or on a web page that is an hosted by an affiliate of coupon distributor 110 or of coupon provider 140. Alternatively, the coupon offer may be displayed as an advertisement provided through a third-party mobile application (for example, a music application) executing on a device (for example, a "smart" phone) of social user 150.

At block 210, the coupon offer is in a "locked" state. In other words, the user is unable to access the coupon offer. The user is required to perform one or more actions in order to receive the coupon offer or, in other words, access the coupon associated with the coupon offer. Unless those one or more actions are performed, the user cannot access the coupon offer. "Accessing" a coupon offer may involve (a) receiving a coupon code associated with the coupon offer or (b) being able to print a coupon associated with the coupon offer. Once a user accesses a coupon offer, the user is able to redeem the coupon offer.

3.1 "Liking" an Item

At block 220, social user 150 provides input in an attempt to "unlock" the coupon offer. In an embodiment, block 220 involves social user 150 selecting social network data that is displayed concurrently and adjacent to coupon offer. The social network data may be any selectable data item (such as a graphical button) that is associated with social network provider 130. For example, if social network provider 130 is Google, then the button may be a "+1" button. As another example, if social network provider 130 is Facebook, then the button may be a "Like" or "Recommend" button. The button may be implemented using an iFrame or JavaScript in HTML of a web page that includes the coupon offer.

The input that is received as a result of a user's action at block 220 is referred to herein as "liking" an item. "Liking" an item may involve a user clicking or otherwise selecting a graphical data item that is associated with a particular social network provider. When a user selects the data item, the user effectively agrees to the terms (dictated by the social network provider) that are associated with performing that action. The terms associated with liking an item may involve having the social user's node, in the social network, linked with a node associated with the entity that initiates the coupon offer. For example, social user 150 is registered with social network provider 130 and selects a button that is associated with social network provider 130 and that is displayed concurrently with a coupon offer for Beta batteries. Selecting the button indicates the willingness on the part of social user 150 to have his/her profile linked with a profile for Beta batteries. Being willing to link one's node to another node typically entails also being willing to have one's friends in the social network notified about the linking. In other words, the terms associated with liking an item may also involve allowing friends of the user (that selected the icon) to see that the user "liked" the item. Thus, friends of the user that "liked" particular content may be notified, by the social network provider, with a message indicating that the user "liked" that particular content.

3.2 Determine Whether to Unlock Offer

In an embodiment, instead of unlocking a coupon offer immediately upon detecting that a user "liked" the coupon offer, coupon distributor 110 (or coupon provider 140) determines, based on one or more criteria, whether to unlock the coupon offer. The one or more criteria may involve one or more determinations, or "checks." The following describes three checks: a "like" check, an inventory check, and an access check. Although the following description and FIG. 2 indicate that each of these three checks is performed, coupon distributor 110 (or coupon provider 140) may instead perform less than all of the checks. Thus, for example, process 200 may proceed from 220 directly to block 240, block 250, or block 260.

3.2.1 "Like" Check

At block 230, it is determined whether social user 150 already "liked" the coupon offer. If a user has already liked the coupon offer, then coupon distributor 110 (or coupon provider 140) may want to prevent the user from obtaining an additional coupon offer for the same product. In other words, the terms of a coupon offer may indicate that any particular user is only allowed to "like" a coupon offer once. The determination of whether social user 150 already "liked" the coupon offer may be performed by coupon distributor 110 (or by coupon provider 140). The determination is based on data sent from the user's device.

As a result of liking the coupon offer at block 220, the device of social user 150 sends a "like" message to coupon distributor 110. (In an embodiment where coupon distributor 110 is not involved, the device of social user 150 sends the like message to coupon provider 140 or an affiliate of coupon provider 140.) For example, selecting a "Like" or "+1" button causes code in a web page that includes the button to execute. Execution of the code causes a like message to be generated and transmitted from social user 150's device to coupon distributor 110. The like message includes offer data and social user data. The offer data may identify the specific coupon offer (for example, an offer identifier), the product associated with the coupon offer (for example, "Beta AAA Rechargeable Batteries"), or the brand of the product (for example, "Beta Batteries"). The social user data is data that identifies social user 150 to social network provider 130. For example, the social user data may include a user name and password that is used to authenticate social user 150 to social network provider 130.

If social user 150 is not registered with (or logged into) social network provider 130 at the time that social user 150 "likes" the coupon offer, then social user 150 is prompted to so register (or log in). After registering or logging in, social user data is sent to coupon distributor 110.

In response to receiving the like message from social user 150's device, coupon distributor 110 (or coupon provider 140) generates and sends, to social network provider 130, a verification message that includes data that is based on the offer data and social user data received from social user 150's device. For example, the verification message may include the same social user data and the same offer data. As another example, the verification message may include offer data that is different than the offer data indicated in the like message from social user 150's device.

Social network provider 130 uses the verification message to determine whether social user 150 already "liked" the coupon offer. For example, social network provider 130 may use the social user data included in the verification message to determine whether social user 150 is registered with social network provider 130 and, if so, uses the offer data included in the verification message to determine whether social user 150 is already linked with a node that corresponds to the coupon offer.

Social network provider 130 sends, to coupon distributor 110 (or coupon provider 140), result data that indicates whether social user 150 has already "liked" the coupon offer (or the product or brand associated with the coupon offer). If so, then process 200 proceeds to block 280 where the coupon offer remains locked. In other words, coupon distributor 110 (or coupon provider 140) will not perform any actions to "unlock" the coupon offer with respect to social user 150. If social user 150 has not yet "liked" the coupon offer, then process 200 proceeds to block 240.

3.2.2 Inventory Check

At block 240, it is determined whether there is sufficient inventory associated with the coupon offer. If not, then process 200 proceeds to block 280. Otherwise, process 200 proceeds to block 250. As noted previously, block 240 may be optional. Thus, process 200 may proceed from block 230 or block 220 directly to block 250 or block 260.

"Inventory" may refer to the number of coupon offers that have been distributed to end-users, the number of coupon offers that have been redeemed, the number of items associated with the coupon offer (for example, a specific product, concert tickets, etc.) that remain in stock, or some other metric.

For example, prior to a coupon campaign to distribute a particular coupon offer, coupon provider 140 may determine that only 1000 coupon offers should be distributed. If social user 150 "likes" the particular coupon offer (or, for example, the associated brand) and 1000 coupon offers of the particular coupon offer have already been unlocked during the coupon campaign, then the particular coupon offer remains locked to social user 150 (and other users that attempt to unlock the particular coupon offer). In this example, the "inventory" refers to the number of remaining coupon offers of this particular coupon. As noted previously, the "inventory" may refer to another factor, such as the number of coupons (associated with the particular coupon offer) that have been redeemed so far.

If coupon distributor 110 is responsible for distributing the coupon offer on behalf of coupon provider 140, then coupon distributor 110 may store data that indicates a current inventory associated with the coupon offer. Thus, checking whether there is sufficient inventory associated with the coupon offer may involve coupon distributor 110 checking a locally stored value. Alternatively, coupon provider 140 may maintain an "inventory value" that indicates a current inventory associated with the coupon offer. In this case, coupon distributor 110 may send, over network 120 to coupon provider 140, a request for the current inventory level or simply for an indication of whether there is sufficient inventory available. Based on a response from coupon provider 140, coupon distributor 110 determines whether there is sufficient inventory to allow the coupon offer to be unlocked to social user 150.

3.2.3 Access Check

At block 250, it is determined whether social user 150 has reached a certain limit in terms of the number of times social user 150 has accessed the coupon offer. For some coupon campaigns, any user is only allowed to access the coupon offer once, although the limit may be higher for other coupon campaigns. Block 250 may be performed by coupon distributor 110 or coupon provider 140.

Block 250 may initially involve determining whether a particular plug-in is installed on social user 150's device. The particular plug-in may be an ActiveX plug-in to a web browser. An example of the particular plug-in is described in U.S. patent application Ser. No. 12/274,348, filed Nov. 19, 2008 and is incorporated herein by reference as if fully set forth herein.

If the user's device has not yet installed the particular plug-in, then, in an embodiment, the plug-in must be installed before the coupon offer is unlocked. Thus, after a user "likes" a coupon offer and coupon distributor 110 (or coupon provider 140) discovers that the user's device does not have the plug-in installed, coupon distributor 110 may prompt the user to install the plug-in. Once installed, the plug-in (1) identifies one or more attributes of the user's device, (2) generates, based on the one or more attributes, signature data that identifies the user's device, and (3) sends, over a network, the signature data to coupon distributor 110 (or coupon distributor 140). Once the plug-in is installed and sends signature data to the appropriate entity, that entity determines, based on the signature data, whether social user 150 has accessed the coupon offer previously or, optionally, determines a number of times social user 150 accessed the coupon offer. In order to make this determination, coupon distributor 110 (or coupon provider 140) may access a database of signatures, each of which is associated with history data that indicates one or more resources (for example, coupon offers) to which the plug-in previously requested access (for example, to print). From the history data associated with the signature data that identifies social user 150's device, it is determined whether social user 150 has reached a limit with respect to the coupon offer.

In some situations, the plug-in may have been previously installed on social user 150's device but, at the time of process 200, the plug-in may not be installed on social user 150's device. This may happen if social user 150 intentionally uninstalls the plug-in in order to attempt to access the coupon offer again in violation of the terms of the coupon campaign (that may indicate only one coupon per user). This also may happen if the plug-in was unintentionally uninstalled. Regardless of the reason(s) for uninstalling the plug-in, re-installing and running the plug-in would cause the plug-in to generate the same signature data that the previously-installed plug-in generated prior to the un-installation. Thus, coupon distributor 110 (or coupon provider 140) can know if the user previously accessed (for example, printed) a coupon (whether for the same or different current coupon offer) from the same user device.

Block 250 may be performed in addition to block 230 because social user 150 may have "liked" the coupon offer previously using one social network provider and then attempts to "like" the coupon offer again using a different social network provider. Thus, execution of block 250 prevents a user, using the same device, from accessing the same coupon offer using different social network providers.

If it is determined that social user 150 has not exceeded his/her limit with respect to accessing the coupon offer, then process 200 proceeds to block 260. Otherwise, process 200 proceeds to block 280 where the coupon offer remains locked.

In an embodiment, block 250 involves determining whether the end of a coupon campaign associated with a coupon offer has pasted. For example, coupon distributor 110 may determine, based on coupon data received from social user 150's device, that the associated coupon offer is part of a coupon campaign that has terminated. In this case, coupon distributor 110 (or coupon provider 140) does not unlock the coupon offer for social user 150. Coupon distributor 110 may instead send, to the device of social user 150, a termination message that indicates that the coupon campaign has ended or that the coupon offer is no longer being offered.

3.2.4 Changes to a Check

In an embodiment, one or more changes may occur that affect whether or when a check is performed during the campaign of the coupon offer. For example, one or more criteria may be used to determine whether, for a particular coupon campaign, the three "checks" described previously (i.e., the "like" check, the inventory check, and the access check) are implemented. As an example regarding the "like" check, at a first point in time, the "like" check is performed for any particular user that attempts to unlock a coupon offer. Later, at a second point in time, coupon provider 140 may decide to have that "like" check removed, thus allowing a user to "like" a coupon offer multiple times. Thus, a social user that is not able to like the coupon offer at the first point in time due to the "like" check is able to like the coupon offer at the second point in time.

As an example regarding the inventory check, at a first point in time, the inventory for a product (or other item) is at such a level that a coupon offer is not unlocked for any particular user that attempts to unlock the coupon offer. For example, coupon provider 140 may have originally only wanted to allow 800 coupon offers to be unlocked to different users. Later, at a second point in time, the inventory associated with the product increases. For example, coupon provider 140 may determine that it would like 1000 coupon offers to be available for unlocking. The change in inventory may occur (1) prior to the inventory decreasing to a point where one or more users would be denied access to the coupon offer due to the inventory check or (b) after one or more users are denied access to the coupon offer due to the inventory check.

As an example regarding the access check, at a first point in time, the policy of a coupon campaign for a coupon offer may be that a user may print (or otherwise access) a coupon offer only once. Later, at a second point in time, coupon provider 140 may determine to increase that limit to two. Thus, social user 150 may have been denied access to a coupon offer at the first point in time but, due to the change in the access limit, may then be able to access the coupon offer at the second point in time.

3.3 Unlocking

At block 260, the coupon offer is "unlocked" in such a way that enables social user 150 to access the coupon offer. Depending on the type of offer that is locked, coupon distributor 110 (or coupon provider 140) may "unlock" the offer in different ways. For example, if the offer is for a ticket to a concert, a ticket distributor (similar to coupon distributor 110) may send a unique ticket identifier to social user 150, who can use that identifier to obtain a ticket (whether online or in person) from a concert ticket distributor.

As another example, if the offer is for a coupon, then coupon distributor 110 (or coupon provider 140) sends a coupon code to the device that social user 150 used to "like" the coupon offer. Alternatively, the coupon code may be sent to an email account associated with social user 150. In either case, the coupon code may be written down by the user or copied from a webpage and pasted into an input field of another web page (for example, hosted by coupon provider 140) or into a non-browser software application, such as a mobile application, that may accept the coupon code to allow social user 150 to redeem the coupon. Alternatively, social user 150 may present the coupon code during a point-of-sale (POS) transaction.

The coupon code may be in any form, such as a series of alphanumeric characters or an image. The coupon code may be unique relative to other coupon codes that are generated for the same coupon campaign for the same product. The system that accepts the coupon code may determine whether the coupon code has been used before and, if so, reject the coupon code.

As another example, "unlocking" a coupon offer may entail allowing social user 150 to print a digital coupon. Such printing may be enforced by a print plug-in executing on the user's device and a remote server communicating with each other (as described previously). Block 260 may involve the print plug-in communicating with a print driver executing on social user 150's device. The print driver may cause a print user interface to be displayed on the user's device. The print user interface allows the user to select different print settings, such as which printer will print the coupon, the number of copies, paper size, orientation, scale, and print quality and speed. Once the user is satisfied with the settings (one or more of which may be default settings), the user may then select a "Print" button, which causes the coupon to be printed by the designated printer.

In the print scenario, two instances of user input may be required to unlock and print a coupon. For example, a user may be required to select a "Like" button to unlock a coupon offer and then select a "Print" button to print a coupon associated with the coupon offer. In an embodiment, a single instance of user input is required to unlock and print a coupon. For example, a user may only be required to select a "like" button, which causes, without any further input from the user, a coupon offer to be unlocked and the corresponding coupon to be printed. Such a feature is carried out by coupon distributor 110 (or coupon provider 140) communicating with the print plug-in executing on the user's device and the print plug-in communicating with the appropriate print driver executing on the user's device.

3.4 Social Notification Message

At block 270, as a result of the coupon offer becoming unlocked, a social notification message is sent to "friends" of social user 150. Block 270 may involve coupon distributor 110 (or coupon provider 140) sending, in response to determining to unlock the coupon offer, a link message to social network provider 130.

In an embodiment, coupon distributor 110 uses APIs provided by social network provider 130 to send the link message to social network provider 130. In addition to sending a link message, the APIs may allow coupon distributor 110 to perform one or more other operations, examples of which may include the following: cause a message to be posted to a "wall" or page (hosted by social network provider 130) of social user 150, access information (i.e., maintained by social network provider 130) of social user 150 (for example, gender, age, residence, hobbies), update status messages associated with social user 150, and upload digital media (for example, images) to social user 150's account. For example, for Facebook, the APIs are known as Facebook Graph APIs.

In a related embodiment, instead of coupon distributor 110, social user 150's device sends the link message to social network provider 130 using an API of social network provider 130.

The link message includes social user data that identifies social user 150 and one or more details about the coupon offer. For example, the one or more details may include coupon data that identifies information about the coupon (for example, percentage discount, expiration date of coupon), product data that identifies the product associated with the coupon offer, and/or brand data that identifies the brand of the product. The link message may also include one or more images of the product and/or brand. The link message may also include a link (such as a URL) to a web page where the coupon offer may be received, for example, through a similar process that social user 150 went through in order to unlock the coupon offer. Additionally or alternatively, the link may be to a web page that provides information about the product and/or associated brand.

In response to receiving the link message (whether from coupon distributor 110 or from coupon provider 140), social network provider 130 uses the social user data that identifies social user 150 to identify, within user account database 132, "friends" (or contacts) of social user 150. Social network provider 130 sends a social notification message to each identified friend (subject to any restrictions associated with any of the identified friends. For example, some friends may not want to be notified of social user 150's activities and posts). The social notification message indicates that social user 150 is now "linked" with the coupon offer, the product associated with the coupon offer, and/or the brand of the product. For example, the social notification message may indicate that social user 150 "likes" the coupon offer or likes the product associated with the coupon offer. If the social notification message includes a link to the coupon offer, then, if friends start linking to the coupon offer, the coupon offer may quickly "go viral." In this way, many potential customers will be notified of the coupon offer, many may access the coupon offer, and many may redeem the associated coupon.

3.4.1 "Like" Check

In an embodiment, the social notification message conforms to a particular message template. The message template to which a social notification message conforms may be selected, by a coupon provider, from among multiple message templates. For example, coupon distributor 110 may provide, via a web service, multiple message templates to coupon provider 140 (and other coupon providers, not shown). A coupon provider is allowed to access and select one of the available message templates that the coupon provider would like to (a) populate with content and (b) have sent to friends of users that unlock coupon offer(s) that originate from the coupon provider. The message templates dictate what content is to be included in a social notification message that friends of a user that unlocks an offer will receive. As noted above, the content provided by a coupon provider may include text, images, graphics, audio, and link(s). Additionally, the message templates may dictate how the content is to be displayed. For example, one message template may dictate that text is to appear above an image, that a link is to appear below the image, and that the image is to be of a certain shape. Another message template may dictate that text is to appear below an image and that the text itself includes a link.

After coupon provider 140 selects a message template and provides content to be included in the selected message template, coupon distributor 110 stores the selected template and content in a database and associates the selected template and content with coupon provider 140. Additionally, coupon distributor 110 may store data that associates a specific coupon offer with the selected template and content.

Later, in response to determining that social user 150 successfully past any checks (such as a "like" check and an inventory check) associated with a coupon offer initiated by coupon provider 140, coupon distributor 110 identifies a message template and content.

The identification of the message template and content may be based on data received in a message from the device of social user 150. The data may be data that identifies the coupon offer (for example, a unique coupon identifier assigned by coupon distributor 110) or may be data that identifies the entity that provides the coupon offer.

Additional criteria that may be used to identify the message template and/or content include user behavior, time of day, attributes of the message received from the device of social user 150, etc. For example, coupon distributor 110 may maintain one message template for a particular coupon for relatively "active" users (i.e., ones that access many coupons) and another message template for the particular coupon for "non-active" users (i.e., ones that access few or no coupons). As another example, coupon distributor 110 may maintain one set of content for a particular coupon that is unlocked in the morning hours and another set of content for the particular coupon that is unlocked in the evening hours.

Coupon distributor 110 then sends, to social network provider 130, a link message that includes the content formatted according to the associated message template.

3.5 Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
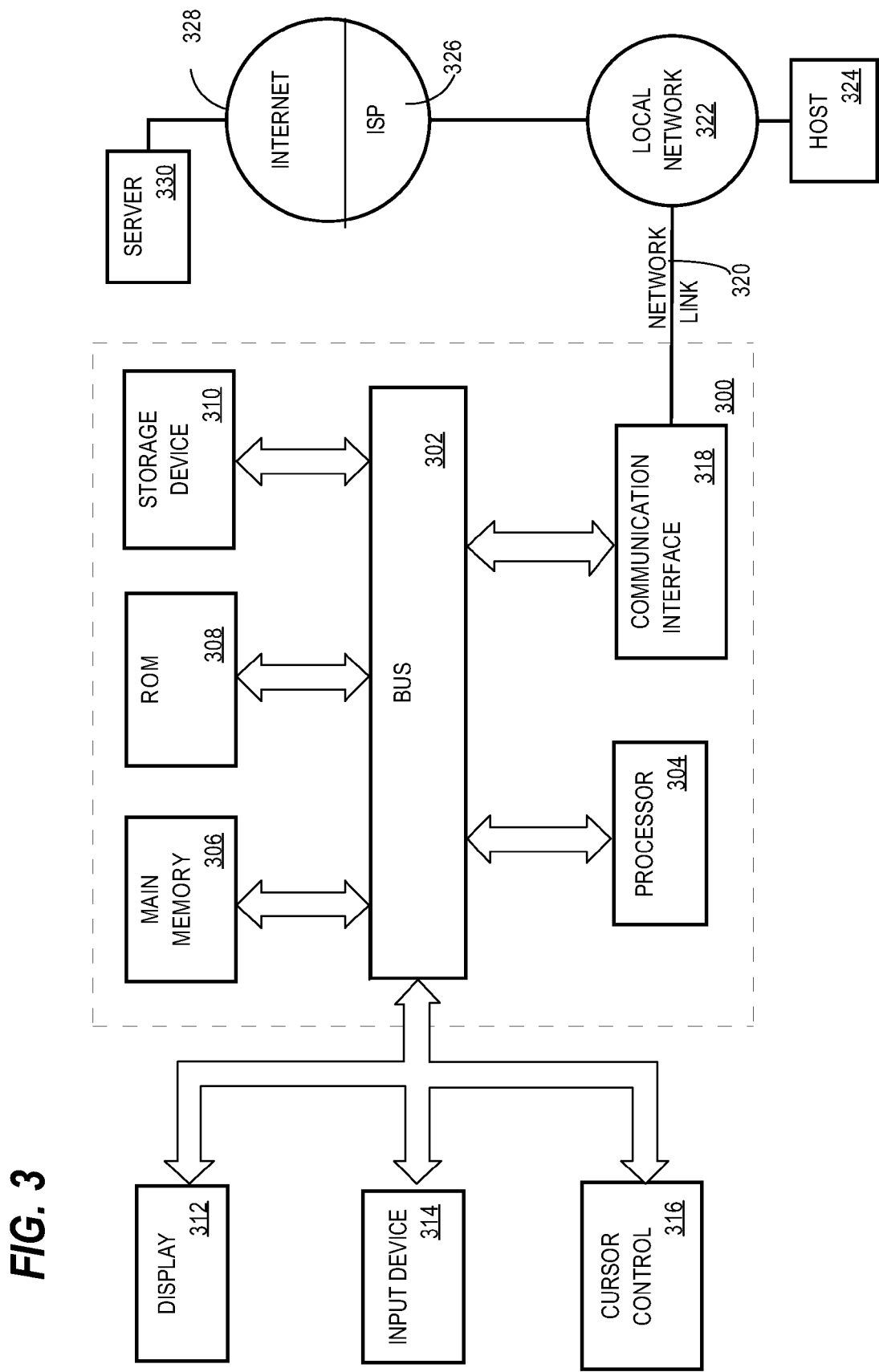
FIG. 3 illustrates a computer system upon which embodiments of the invention may be implemented.

For example, FIG. 3 is a block diagram that illustrates a computer system 300. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (for example, x) and a second axis (for example, y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process blocks described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 may transmit a requested code for an application program through Internet 328, ISP 326, local network 322 and communication interface 318. The received code may be executed by processor 304 as it is received, and/or stored in storage device 310, or other non-volatile storage for later execution.

3.6 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving an indication that a user has selected social network data that is associated with a social network provider that maintains a social graph, that, when selected, indicates approval of a coupon offer by the user, and that is displayed, on a client device, concurrently with offer data that indicates the coupon offer and does not include a coupon;
   wherein prior to receiving the indication, the user of the client device is incapable of accessing the coupon;
   in response to receiving the indication that the user selected the social network data: providing the coupon to the user;
   causing, by one or more computers, a message to be sent to each other user of a plurality of other users that are identified, in the social graph that the social network provider maintains, as connected to the user, wherein the message includes data about the coupon offer.

2. The method of claim 1, wherein providing the coupon to the user includes (a) causing a coupon code to be sent to a device of the user, wherein the coupon code is required to redeem the coupon or (b) allowing the user to print the coupon.

3. The method of claim 1, further comprising causing a user node that is associated with the user to be linked, within the social graph, with a coupon node that is associated with the coupon offer.

4. The method of claim 1, further comprising, prior to providing the coupon to the user:
   determining whether a user node that is associated with the user is already linked, within the social graph, with a coupon node that is associated with coupon offer;
   wherein allowing the user to access the coupon offer is performed only in response to determining that the user node is not linked, within the social graph, with the coupon node.

5. The method of claim 1, further comprising, prior to providing the coupon to the user:
   identifying inventory data that indicates whether there is sufficient inventory associated with the coupon offer;
   wherein the inventory associated with the coupon offer has been reduced by multiple users other than the user;
   wherein providing the coupon to the user is performed only in response to determining, based on the inventory data, that there is sufficient inventory associated with the coupon offer.

6. The method of claim 1, further comprising, prior to providing the coupon to the user:
  determining whether the user has been provided the coupon more than a particular number of times;
  wherein providing the coupon to the user is performed only in response to determining that the user has not been provided the coupon more than the particular number of times.

7. The method of claim 1, further comprising, prior to receiving the indication:
  receiving, by a coupon distributor, from a first coupon provider that initiated the coupon offer, input that selects a first message template of a plurality of message templates, wherein the first message template dictates what type of information will be in the message or how the message will be formatted;
  receiving, from the first coupon provider, first content that is to be included in the message;
  storing association data that associates the first content with the first message template and the first coupon provider.

8. The method of claim 7, wherein causing the message to be sent comprises:
  identifying, based on the association data, the first content and the first message template;
  sending, to the social network provider that maintains the social graph, a link message that includes the first content and that is formatted according to the first message template.

9. The method of claim 7, further comprising:
  receiving, from a second coupon provider that is different than the first coupon provider, second input that selects a second message template of the plurality of message templates;
  receiving, from the second coupon provider, second content that is to be included in a second message;
  storing second association data that associates the second content with the second message template and the second coupon provider.

10. The method of claim 1, wherein the social graph is a first social graph and the social network provider is a first social network provider, the method further comprising:
  receiving a second indication that a second user selected second social network data that is displayed, on a second client device, concurrently with the second offer data that indicates a second coupon offer that does not include a second coupon that corresponds to the second coupon offer;
  wherein the second social network data is associated with a second social network provider that is different than the first social network provider and that maintains a second social graph that is different than the first social graph;
  wherein prior to receiving the second indication, the second user of the second client device is incapable of accessing the second coupon;
  in response to receiving the second indication:
    providing the second coupon to the second user;
    causing a second message to be sent to each user of a second plurality of users that are identified, in the second social graph, as connected to the second user, wherein the second message includes data about the second coupon offer.

11. The method of claim 1, wherein the coupon offer is a first coupon offer, a first coupon provider initiated the first coupon offer, the first coupon provider is different than a second coupon provider, the method further comprising:
  receiving a second indication that a second user selected second social network data that is displayed, on a second client device, concurrently with second offer data that indicates a second coupon offer that does not include a second coupon that corresponds to the second coupon offer;
  wherein the second coupon provider that is different than the first coupon provider initiated the second coupon offer;
  wherein prior to receiving the second indication, the second user of the second client device is incapable of accessing the second coupon offer;
  in response to receiving the second indication that the second user selected the second social network data:
    providing the second coupon to the second user;
    causing a message to be sent to each user of a plurality of users that are identified, in a second social graph, as connected to the user, wherein the message includes data about the second coupon offer or the second coupon provider.

12. A computer-implemented method comprising:
  receiving an indication that a particular user is willing to be associated, in a social graph that is maintained by a social network provider that stores (a) user data that indicates a set of users that are registered with the social network provider and (b) connection data that indicates connections among the set of users, with an offer provider in exchange for an offer provided by the offer provider that is different than the social network provider;
  wherein prior to receiving the indication, the particular user is incapable of accessing a promotion associated with the offer;
  in response to receiving the indication, determining whether a previous indication was received that indicated that the particular user was willing to be associated with the offer provider;
  in response to determining that the previous indication was not received:
    providing the promotion to the particular user;
    causing, by one or more computers, a message to be sent to each user of a plurality of users that are identified, in the social graph, as being connected to the particular user, wherein the message indicates that the particular user is associated with the offer provider.

13. One or more storage media storing instructions which, when executed by one or more processors, cause:
  receiving an indication that a user has selected social network data that is associated with a social network provider that maintains a social graph, that, when selected, indicates approval of a coupon offer by the user, and that is displayed, on a client device, concurrently with offer data that indicates the coupon offer and does not include a coupon;
  wherein prior to receiving the indication, the user of the client device is incapable of accessing the coupon;
  in response to receiving the indication that the user selected the social network data: providing the coupon to the user;
  causing a message to be sent to each other user of a plurality of other users that are identified, in a social graph that the social network provider maintains, as connected to the user, wherein the message includes data about the coupon offer.

14. The one or more storage media of claim 13, wherein providing the coupon to the user includes (a) causing a coupon code to be sent to a device of the user, wherein the coupon code is required to redeem the coupon or (b) allowing the user to print the coupon.

15. The one or more storage media of claim 13, wherein the instructions, when executed by the one or more processors, further cause causing a user node that is associated with the user to be linked, within the social graph, with a coupon node that is associated with the coupon offer.

16. The one or more storage media of claim 13, wherein the instructions, when executed by the one or more processors, further cause, prior to providing the coupon to the user:
   determining whether a user node that is associated with the user is already linked, within the social graph, with a coupon node that is associated with coupon offer;
   wherein providing the coupon to the user is performed only in response to determining that the user node is not linked, within the social graph, with the coupon node.

17. The one or more storage media of claim 13, wherein the instructions, when executed by the one or more processors, further cause, prior to providing the coupon to the user:
   identifying inventory data that indicates whether there is sufficient inventory associated with the coupon offer;
   wherein the inventory associated with the coupon offer has been reduced by multiple users other than the user;
   wherein providing the coupon to the user is performed only in response to determining, based on the inventory data, that there is sufficient inventory associated with the coupon offer.

18. The one or more storage media of claim 13, wherein the instructions, when executed by the one or more processors, further cause, prior to providing the coupon to the user:
   determining whether the user has been provided the coupon more than a particular number of times;
   wherein providing the coupon to the user is performed only in response to determining that the user has not been provided the coupon more than the particular number of times.

19. The one or more storage media of claim 13, wherein the instructions, when executed by the one or more processors, further cause, prior to receiving the indication:
   receiving, by a coupon distributor, from a first coupon provider that initiated the coupon offer, input that selects a first message template of a plurality of message templates, wherein the first message template dictates what type of information will be in the message or how the message will be formatted;
   receiving, from the first coupon provider, first content that is to be included in the message;
   storing association data that associates the first content with the first message template and the first coupon provider.

20. The one or more storage media of claim 19, wherein causing the message to be sent comprises:
   identifying, based on the association data, the first content and the first message template;
   sending, to the social network provider that maintains the social graph, a link message that includes the first content and that is formatted according to the first message template.

21. The one or more storage media of claim 19, wherein the instructions, when executed by the one or more processors, further cause:
   receiving, from a second coupon provider that is different than the first coupon provider, second input that selects a second message template of the plurality of message templates;
   receiving, from the second coupon provider, second content that is to be included in a second message;
   storing second association data that associates the second content with the second message template and the second coupon provider.

22. The one or more storage media of claim 13, wherein the social graph is a first social graph and the social network provider is a first social network provider, wherein the instructions, when executed by the one or more processors, further cause:
   receiving a second indication that a second user selected second social network data that is displayed, on a second client device, concurrently with the second offer data that indicates a second coupon offer that does not include a second coupon that corresponds to the second coupon offer;
   wherein the second social network data is associated with a second social network provider that is different than the first social network provider and that maintains a second social graph that is different than the first social graph;
   wherein prior to receiving the second indication, the second user of the second client device is incapable of accessing the second coupon;
   in response to receiving the second indication:
      providing the second coupon to the second user;
      causing a second message to be sent to each user of a second plurality of users that are identified, in the second social graph, as connected to the second user, wherein the second message includes data about the second coupon offer.

23. The one or more storage media of claim 13, wherein the coupon offer is a first coupon offer, a first coupon provider initiated the first coupon offer, the first coupon provider is different than a second coupon provider, wherein the instructions, when executed by the one or more processors, further cause:
   receiving a second indication that a second user selected second social network data that is displayed, on a second client device, concurrently with second offer data that indicates a second coupon offer that does not include a second coupon that corresponds to the second coupon offer;
   wherein the second coupon provider that is different than the first coupon provider initiated the second coupon offer;
   wherein prior to receiving the second indication, the second user of the second client device is incapable of accessing the second coupon offer;
   in response to receiving the second indication that the second user selected the second social network data:
      providing the second coupon to the second user;
      causing a message to be sent to each user of a plurality of users that are identified, in a second social graph, as connected to the user, wherein the message includes data about the second coupon offer or the second coupon provider.

24. One or more storage media storing instructions which, when executed by one or more processors, cause:
   receiving an indication that a particular user is willing to be associated, in a social graph that is maintained by a social network provider that stores (a) user data that indicates a set of users that are registered with the social network provider and (b) connection data that indicates connections among the set of users, with an offer provider in exchange for an offer provided by the offer provider that is different than the social network provider;

wherein prior to receiving the indication, the particular user is incapable of accessing a promotion associated with the offer;

in response to receiving the indication, determining whether a previous indication was received that indicated that the particular user was willing to be associated with the offer provider;

in response to determining that the previous indication was not received:
  providing the promotion to the particular user;
  causing a message to be sent to each user, of a plurality of users that are identified, in the social graph, as being connected to the particular user, wherein the message indicates that the particular user is associated with the offer provider.

\* \* \* \* \*